United States Patent
Ushiku

(10) Patent No.: US 8,239,958 B2
(45) Date of Patent: Aug. 7, 2012

(54) CONFIRMATION METHOD OF SOFTWARE AND APPARATUS FOR EXECUTING SOFTWARE

(75) Inventor: Toyohiko Ushiku, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 12/467,422

(22) Filed: May 18, 2009

(65) Prior Publication Data

US 2009/0228880 A1 Sep. 10, 2009

Related U.S. Application Data

(63) Continuation of application No. 11/081,625, filed on Mar. 17, 2005, now Pat. No. 7,590,851.

(30) Foreign Application Priority Data

Mar. 31, 2004 (JP) .................. 2004-105876

(51) Int. Cl.
*H04L 9/32* (2006.01)
(52) U.S. Cl. .......................... 726/26; 726/27
(58) Field of Classification Search ............ 726/26–27, 726/30–31; 713/161, 165, 167–168, 170, 713/176, 189; 705/57–59
See application file for complete search history.

(56) References Cited

U.S. PATENT DOCUMENTS

| | | | |
|---|---|---|---|
| 4,685,055 A | 8/1987 | Thomas | 705/56 |
| 5,724,425 A | 3/1998 | Chang et al. | 705/52 |
| 5,802,275 A | 9/1998 | Blonder | 395/186 |
| 5,812,980 A | 9/1998 | Asai | 705/1 |
| 6,005,942 A | 12/1999 | Chan et al. | 713/187 |
| 6,983,371 B1 * | 1/2006 | Hurtado et al. | 713/189 |
| 7,237,112 B1 | 6/2007 | Ishiguro et al. | 713/169 |
| 7,237,117 B2 | 6/2007 | Weiss | 713/186 |
| 7,240,200 B2 * | 7/2007 | Lotspiech | 713/168 |
| 7,590,851 B2 * | 9/2009 | Ushiku | 713/176 |
| 2003/0110011 A1 | 6/2003 | Kyotoku | 702/186 |

FOREIGN PATENT DOCUMENTS

| | | |
|---|---|---|
| EP | 1 113 407 | 12/2000 |
| JP | 2-31227 A1 | 2/1990 |
| JP | 08-147158 | 6/1996 |
| JP | 10-187433 A1 | 7/1998 |
| JP | 2000-276332 | 10/2000 |
| JP | 2000-322254 A1 | 11/2000 |
| JP | 2001-117660 | 4/2002 |
| JP | 2004-086404 | 3/2004 |

* cited by examiner

*Primary Examiner* — Hosuk Song
(74) *Attorney, Agent, or Firm* — Fitzpatrick, Cella, Harper & Scinto

(57) ABSTRACT

Software contains a confirmation module for confirming the software. The present invention extracts the confirmation module and confirms the software with the extracted confirmation module. Then, the present invention determines validity of the software on the basis of the confirmed result.

15 Claims, 4 Drawing Sheets

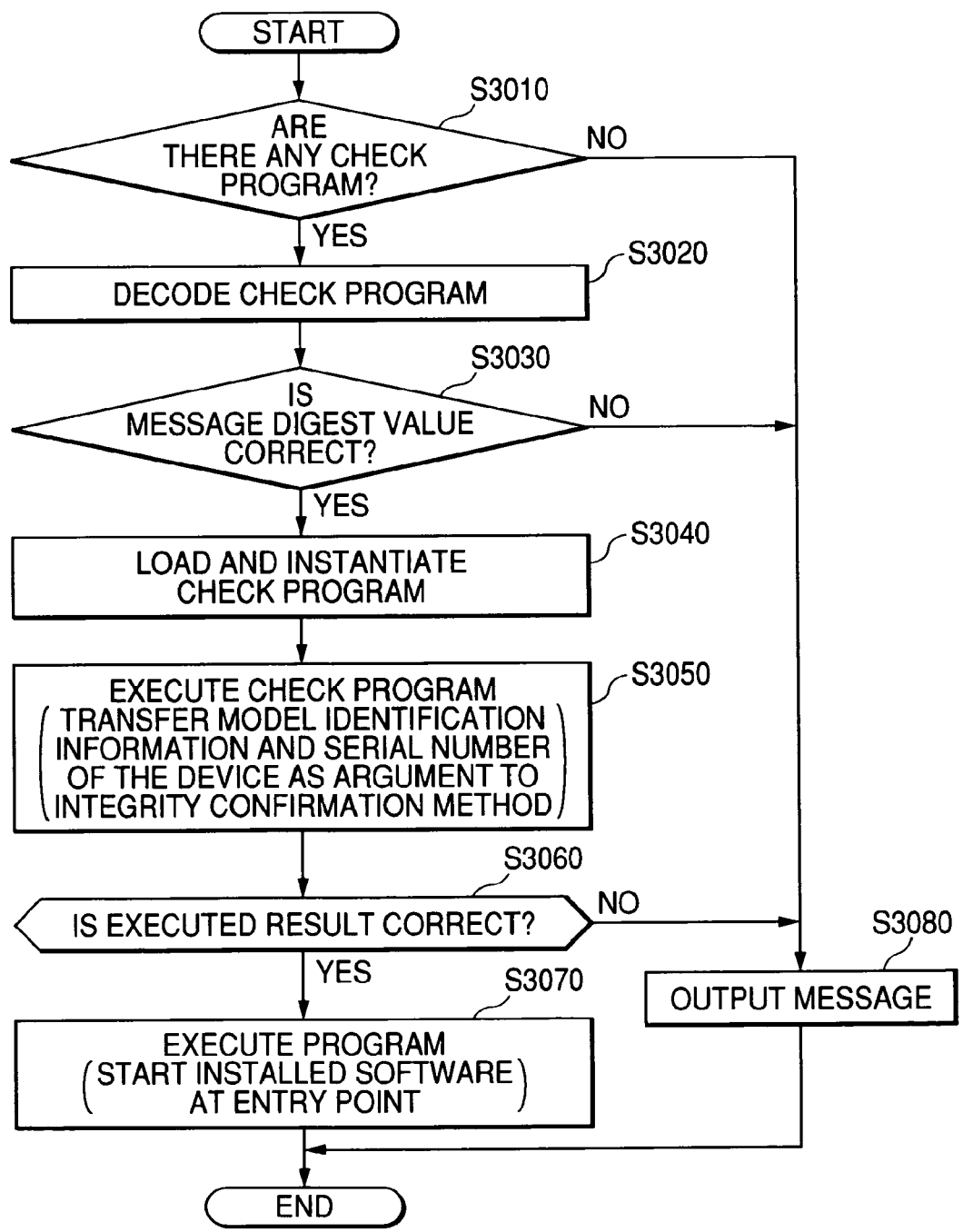

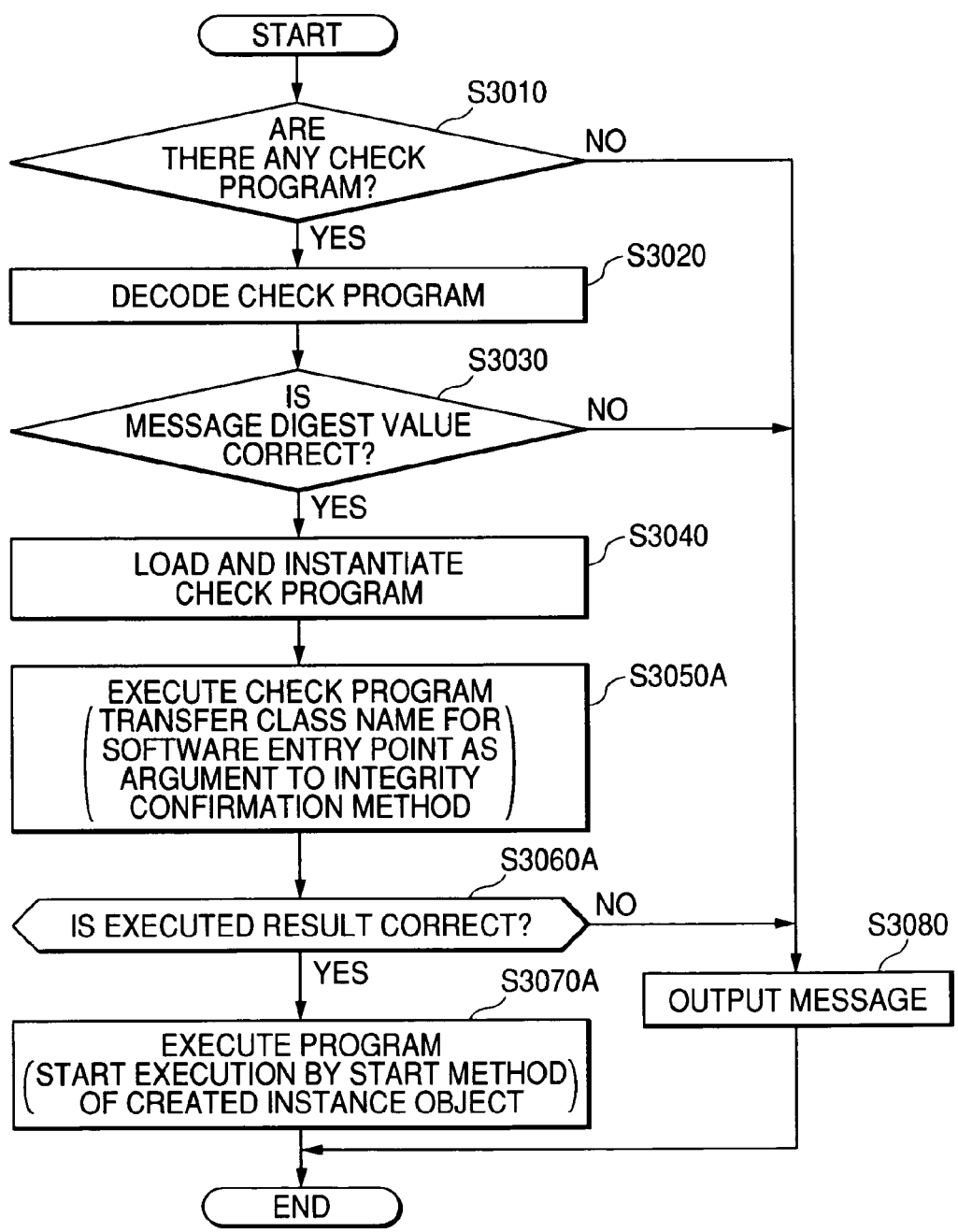

CONFIRMATION METHOD OF SOFTWARE AND APPARATUS FOR EXECUTING SOFTWARE

RELATED APPLICATIONS

This application is a continuation of application Ser. No. 11/081,625, filed Mar. 17, 2005, claims benefit of the filing date of that application under 35 U.S.C. §120, claims priority under 35 U.S.C. §119 from Japanese Patent Application No. 2004-105876, filed Mar. 31, 2004, and incorporates the entire disclosure of both mentioned applications herein by reference.

BACKGROUND OF THE INVENTION

The present invention relates to confirmation method of software and apparatus for executing software.

RELATED BACKGROUND ART

For conventional electronic equipment called "embedded device" with a program embedded in ROM (Read Only Memory) or the like, a hardware alteration such as a ROM exchange is required in order to change the program installed at factory shipment. More and more electronic equipments, even they are embedded devices, are configured to allow software including a program to be installed or replaced after shipment as a general-purpose computer is.

When software, for example a program, is installed after shipment, it is important to prove validity of the program to be installed, i.e., to prove that the program is not maliciously made with an intention to harm electronic equipment after the installation.

For equipment used for the Internet, some methods are provided for proving validity of a program to be installed via networks. As one of the methods, a code signature method in Java (registered trademark) will be described. (Java (registered trademark) is a programming language developed by SUN Microsystems. Java is a registered trademark of SUN Microsystems.)

Java (registered trademark) program is usually delivered in a file format called "Jar file format". A signature is made on this Jar file in Java (registered trademark). The term "signature" used here refers to a digital signature. A digital signature is a bit string calculated from contents data stored in a Jar file and a private key owned by an entity (e.g., a company or an individual). If a bit string of a digital signature differs, the contents data also differs.

In order to authenticate a signature, a developer of a Java (registered trademark) program should be granted a public key to make a pair with a private key and a certification issued by a certificate authority to authenticate the public key. The developer has to submit his/her personal information for identifying himself/herself in order to obtain this certification.

With such a signature attached to a Jar file, a Java (registered trademark) program to be installed can be recognized as a reliable code. Permission granted to the program may be altered for each signatory.

Methods for permitting an execution of an installed program are disclosed in U.S. Pat. No. 5,812,980, Japanese Patent Application Laid-Open No. H2-31227, Japanese Patent Application Laid-Open No. H10-187433 and the like. In the methods, a program exists in electronic equipment from the beginning (e.g., an installer for installing) or an installed program itself confirms particular information owned by an installed program and electronic equipment as well as an externally provided keyword for permitting execution of the program, and when the program confirms it, the program permits execution of the installed program.

Further, methods for installing a program are disclosed in U.S. Pat. No. 5,802,275, Japanese Patent Application Laid-Open No. 2000-322254 and the like. In the methods, a program to be installed is previously encrypted, and when it is installed, it is decrypted with a key for decryption available for the electronic equipment to install the program.

The abovementioned methods using a conventional code signature used as a method for proving validity of a program to be installed on electronic equipment can identify a signatory of the code signature (a program developer), but cannot prove reliability of the signatory for the electronic equipment to have the program installed on it. Therefore, in order to install a program, there is no choice but to believe in the developer of a program just by recognizing his/her signature on it and to install a program without any evidence to prove reliability of the developer for the electronic equipment.

Moreover, those who want to install a program on electronic equipment have to access a certificate authority on a network and validate a certificate attached to the signature authenticated in order to validate the signature. There is no way to validate a signature offline, i.e., when the equipment is not connected to the network.

In the conventional program execution permitting mechanisms disclosed in U.S. Pat. No. 5,812,980 and the like, data used for permission (the above-mentioned particular information or the abovementioned keyword) is fixed. The mechanism lacks flexibility, for example to accept a stronger encryption algorithm.

In the methods for installing a program by loading a previously encrypted program and decrypting the program disclosed in U.S. Pat. No. 5,802,275 and the like, all programs including a program module, which is not needed at the moment, are decrypted at installation. This results in a longer time in the decryption and further in the installation.

SUMMARY OF THE INVENTION

The present invention intends to easily and flexibly guarantee reliability of a program.

The present invention also intends to enable a manufacturer of electronic equipment to authenticate that software installed on electronic equipment is a valid program for the electronic equipment.

The present invention also intends to provide a method for confirming software by extracting a confirmation module for confirming software from the software, and determining whether a confirmed result from the confirmation module extracted at the extracting step is correct or not.

The present invention also intends to provide an apparatus for executing software including storage means for storing software and execution means for executing the software stored in the storage means, wherein the execution means extracts a confirmation module for confirming software from the software stored in the storage means, and determines the confirmed result from the extracted confirmation module.

Other intentions of the present invention will be apparent from the later description of embodiments.

BRIEF DESCRIPTION OF THE DRAWINGS

FIG. 3 is a flowchart for showing processes according to the first embodiment; and FIG. 4 is a flowchart for showing processes according to the second embodiment.

DESCRIPTION OF THE PREFERRED EMBODIMENTS

First Embodiment

Figure 1:
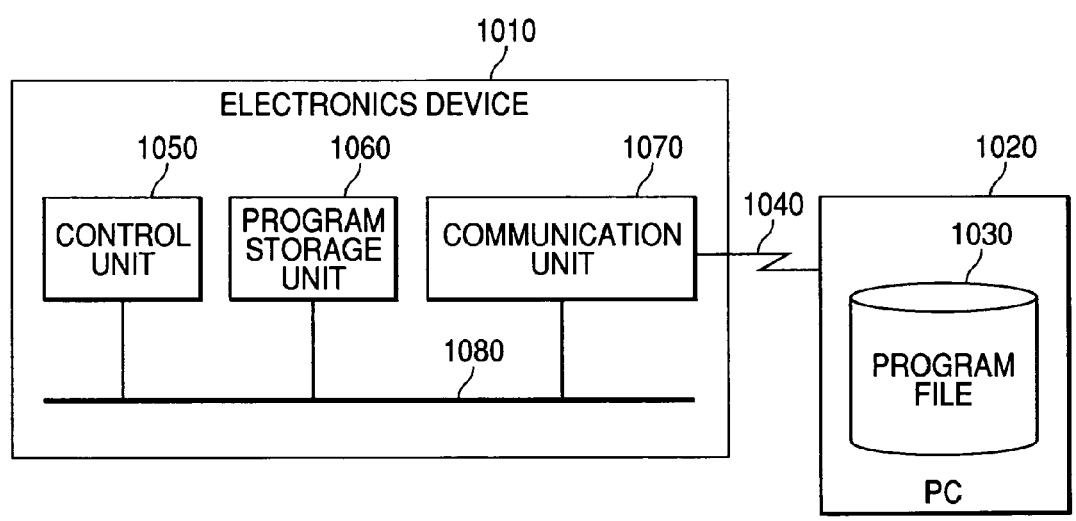
FIG. 1 is a block diagram showing a configuration of substantial part of information processing system according to embodiments.

FIG. 1 is a block diagram showing a configuration of substantial part of information processing system including electronic equipment, which is an example of an apparatus for executing software according to the present invention.

In FIG. 1, the information processing system includes electronic equipment 1010 for executing an installed program and personal computer (PC) 1020 for directing installation of the program by connecting with electronic equipment 1010, which are connected via network 1040.

PC 1020 stores program file 1030 to be installed on electronic equipment 1010. In electronic equipment 1010, control unit 1050 for controlling electronic equipment 1010, program storage unit 1060 for storing a program to be executed in control unit 1050, and communication unit 1070 for communicating with outside via network 1040 are connected by bus 1080. On control unit 1050, a Java (registered trademark) virtual machine (hereinafter called JVM) for interpreting a Java (registered trademark) program is operating, allowing a Java (registered trademark) program to be executed. Control unit 1050 is a computer for reading a program stored in program storage unit 1060 from program storage unit 1060 and processing the program. Electronic equipment 1010 is exemplified as equipment including a printing function and a scanning function. However, the present invention is not limited to such equipment.

A program is installed as below: PC 1020 communicates with control unit 1050 via communication unit 1070 and sends program file 1030 in PC 1020 to electronic equipment 1010. Control unit 1050 received data (program) from program file 1030 stores the data (program) in program storage unit 1060 as a program file in a format structure shown in FIG. 2 described later. Although a program is installed via network 1040 in this example, the present invention is not limited to such a system for installing a program via networks. The present invention can be applied to another system for installing a program from a storage medium such as CD-ROM and DVD-ROM.

Figure 2:
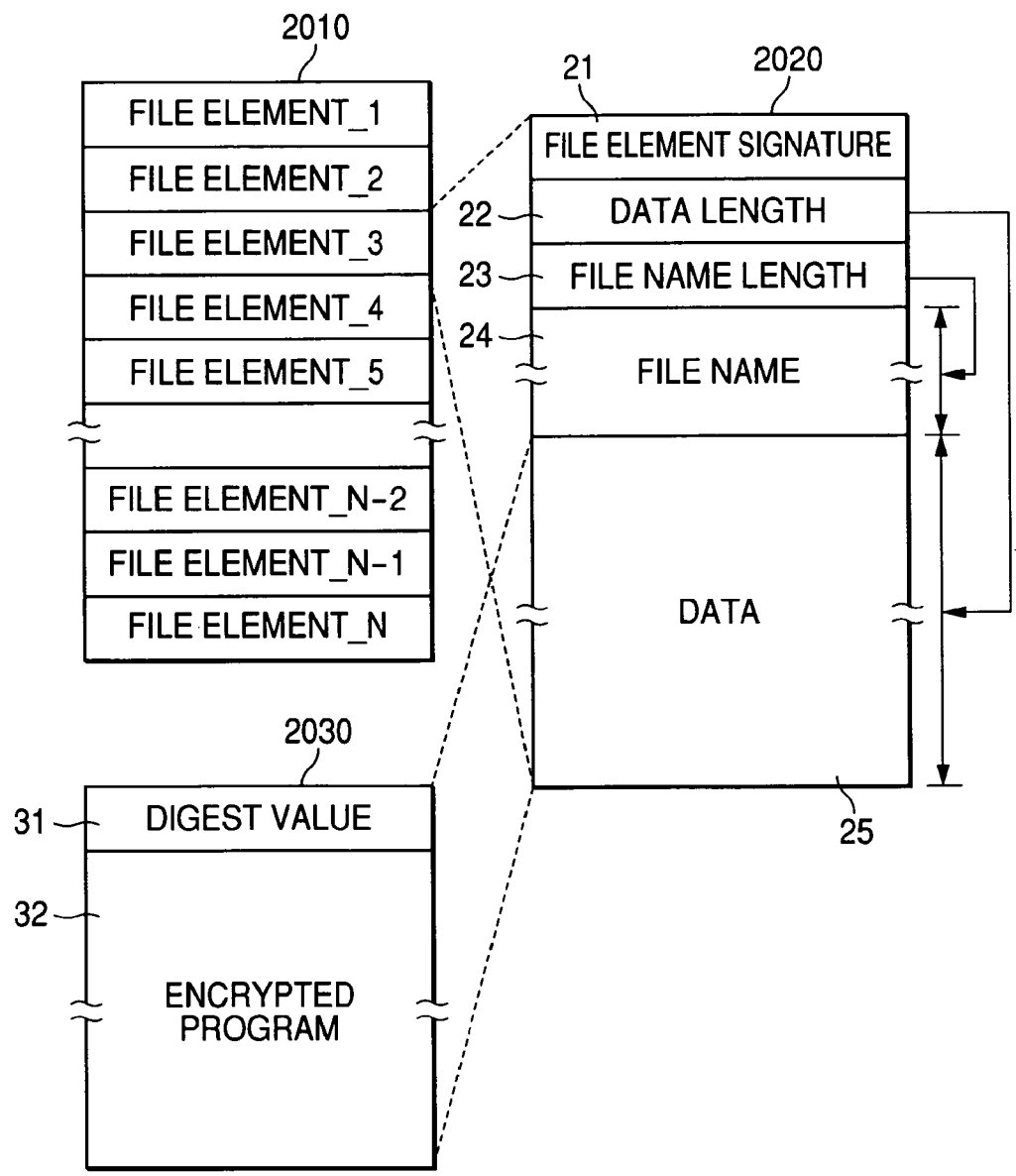
FIG. 2 is a diagram showing a configuration of an archive file used in embodiments.

FIG. 2 is a diagram showing a format of an archive file used for installing a program in electronic equipment 1010 shown in FIG. 1.

In FIG. 2, reference number 2010 denotes an archive file with lineally arranged file elements 1, 2, . . . , N–2, N–1, N. Reference number 2020 denotes contents of each of the file elements 1-N. Each of the file elements 1-N includes File Element Signature information 21 indicating the start of the file element, Data Length information 22 indicating the length of a data region, File Name Length information 23 indicating the length of a file name, File Name field 24 storing file names, and Data filed 25 storing file data.

Reference number 2030 in FIG. 2 denotes a structure (contents) of Data field 25 storing a program. Data field 2030 includes Message Digest Value field 31 for storing message digest value(s) calculated when the program is in an unencrypted format, and Program field 32 storing encrypted program(s). Although a program is encrypted in this embodiment, the present invention is not limited to embodiments with an encrypted program. A program needs not to be encrypted in the present invention.

When a Java (registered trademark) class is stored as a file element of archive file 2010, the full name of the Java (registered trademark) class mapped to a file name is used as a name stored in the File Name field 24. For example, if a class named "com.xyz.aaa.bbb.Class1" exists, a file name "com/xyz/aaalbbb/Class1.class" is used as its file name. The symbol "/" in this file name indicates that it is a directory. The part ".class" is an extension indicating that the Java (registered trademark) program is compiled.

FIG. 3 is a flowchart showing processes according to the first embodiment. Specifically, FIG. 3 shows processes performed to start a program in electronic equipment 1010. This flowchart shows a part of a program installed from PC 1020 on program storage unit 1060. Control unit 1050, which is a computer, reads the program from program storage unit 1060 and processes the program. Program storage unit 1060 is a storage medium storing the program for control unit 1050 to read out.

It is assumed here that a program for confirming software is assigned to Java (registered trademark) class named "com.xyz.check.Checklet". Various attributes of software is stored in a special entry called "Manifest". Manifest stores a pair of an attribute name representing an attribute and an attribute value representing the value as a character string.

At step S3010, control unit 1050 checks the presence of a program module of a check program. That is to say, it takes the file name of "com.xyz.check.Checklet" as "com/xyz/check/Checklet.class". Control unit 1050 checks the presence of a check program by retrieving file elements 2020 one by one from archive file 2010, and checking whether each of the retrieved file elements 2020 is a file element 2020 with the abovementioned file name. This check program is a confirmation module for confirming software from the software stored in archive file 2010.

When the check program exists, the process proceeds to step S3020. When the check program does not exist, the process proceeds to step S3080.

At step S3020, control unit 1050 decrypts the check program. That is to say, control unit 1050 decrypts the check program found at step S3010 with its storing encryption key. Then the process proceeds to step S3030. In this example, the check program is encrypted and stored in program field 32. Accessing an encryption key for decryption is controlled by classes existing In a system library (hereinafter called as encryption key management classes). Encryption key management classes exist in a package "com.xyz.check". A method for accessing an encryption key can be obtained by a method accessible only from classes in the same package. This method is not exposed.

After the decryption of the check program, control unit 1050 calculates a message digest value at step S3030. Then control unit 1050 compares this calculated value and a value in message digest value field 2030 stored in an archive file as a message digest value of the check program. When the calculated message digest value is different from a message digest value stored in the archive file, the check program is considered to be tampered and the process proceeds to step S3080. Otherwise, the process proceeds to step S3040. If the program is not encrypted, the process skips steps S3020 and S3030, and if control unit 1050 determines that a check program exists at step S3010, the process proceeds to step S3080.

At step S3040, control unit 1050 loads/instantiates the check program. That is to say, control unit 1050 loads the class of the check program decrypted at step S3020 for JVM to execute. After loading the program, control unit 1050 instantiates the loaded class and the process proceeds to step S3050.

At step S3050, control unit 1050 executes the check program. Specifically, control unit 1050 calls a confirmation method for confirming the check program against the instance generated at step S3040.

Control unit 1050 passes a predetermined character string (e.g., model identification information for identifying a model of electronic element 1010 to be operated and a serial number for identifying an individual electronic element) as an argument.

With the confirmation method, control unit 1050 determines whether the program can be executed in the specified electronic element in reference to compatible machine information described in Manifest from the model identification information and serial number passed as an argument.

An example of compatible machine information described here is given below.

conform_models=ModelA(1000-),ModelB,Model C(-5000)

That is to say, compatible machine information includes a list of model identification information wherein the indicated models can execute the program. A range of particular serial numbers are specified for some models in this information. The above example shows that models with serial numbers 1000 and more for Model A, models of Model B, and models with serial numbers 5000 and less for Model C will be concerned. In the confirmation method, control unit 1050 checks the passed character string and returns the result. For example, if the model is able to execute the program, control unit 1050 returns the encrypted digital signature of the manufacturer of the electronic equipment. Otherwise, it returns null value. Information used for the confirmation is not limited to model identification information and serial number. Either model identification information or serial number may be used or a predetermined character string may be used for the confirmation. If a predetermined character string is used in the confirmation method, control unit 1050 determines whether the passed character string matches a predetermined character string, and returns the determination.

At next step S3060, control unit 1050 confirms the executed result of the check program. That is to say, control unit 1050 checks whether the executed result of the confirmation method called at step S3050 is an expected value required for its executing environment. In this embodiment, a digital signature granted for the manufacturer of the electronic equipment is encrypted and used as an expected value.

When the executed result from the check program decrypted by an encryption key stored in control unit 1050 matches the digital signature of the manufacturer, control unit 1050 concerns a valid program is installed. Then the process proceeds to step S3070. Otherwise, control unit 1050 concerns that an invalid program is about to be installed and the process proceeds to step S3080. An expected value required by an executing environment is not limited to an encrypted value. If an expected value is not encrypted, it is not decrypted at step S3060. An expected value required by an executing environment is not limited to a digital signature and may be other values.

At step S3070, the program starts at the entry point of installed software. The program starts the software by generating the instance of the class with interpreting that the entry point is described in Manifest as an attribute and an attribute value represents a class and calling the start method.

At step S3080, control unit 1050 outputs an error message. That is to say, control unit 1050 outputs an error message indicating the program was found invalid and failed to start a program, as a log to a log file stored in program storage unit 1060 and does not execute they program.

Software to be started can be confirmed with a flow of processes described above.

According to the first embodiment, electric equipment 1010 is adapted to extract a confirmation module for confirming a program from a program, execute the confirmation module, determine whether the executed result is correct, and, only in response to the determination that the installed program is correct, start the program, in order to execute an installed program. In this manner, the embodiment can easily prove the developer of the program is certified by the developing company of the electronic equipment without accessing a certificate authority on a network when a program is installed on electronic equipment. That is to say, the manufacturer of the electronic equipment proves that the program to be installed is valid for the electric equipment. This easily and flexibly provides a way to install a secure program. This embodiment can check whether the installed program is tampered so that validity of the installed program is secured.

The first embodiment checks whether software is tampered or not by calculating a message digest value of a file storing the software, and comparing the message digest value with a value calculated when the file is generated and previously stored in the file. This method can make a system more robust by making a message digest value stored in the file can be decrypted only by a key for decryption stored in control unit 1050.

Second Embodiment

Next, the second embodiment will be described.

A system configuration and a structure of an archive file according to the second embodiment are identical to those of the first embodiment respectively shown in FIGS. 1 and 2.

FIG. 4 is a flowchart showing processes according to the second embodiment. Specifically, FIG. 4 shows processes performed when a program starts in electronic equipment 1010. In the processes, steps S3010 to S3040 and step S3080 are the same as those shown in FIG. 3.

Only the different processes (steps S3050A, S3060A and S3070A) will be described below.

At step S3050A according to the second embodiment, control unit 1050 calls a confirmation method for confirming a check program for an instance generated at step S3040. Control unit 1050 passes a class name of an entry point of software to this method as an argument. An entry point is described in Manifest as an attribute and can be obtained by interpreting that the attribute value represents the class.

With the confirmation method, control unit 1050 loads data of a specified class from archive file 2010. The loaded class data is encrypted by an encryption key, which can be decrypted with a key for decryption stored in control unit 1050. Therefore, this class data is decrypted with the key for decryption. Then, a class object is generated. If a class object is successfully generated, control unit 1050 returns the class object as a returned value from the method. Otherwise, control unit 1050 returns a null value.

If specified data of an entry class is encrypted with an encryption key that cannot be decrypted with a key for decryption stored in control unit 1050 or tampered, control unit 1050 fails to decrypt the data or the data is decrypted as invalid class data. Then, an attempt to generate a class object or perform an instance object generated from the class object results in an error, so that a use of an invalid encryption key or tampering of an entry class data can be detected.

At step S3060A of the second embodiment, control unit 1050 confirms that the result of confirmation method called at step S3050A is not a null value. If the result is not a null value, the process proceeds to step S3070A. If the result is a null value, control unit 1050 concerns that an invalid program is to be installed and the process proceeds to step S3080.

At step S3070A of the second embodiment, control unit 1050 generates an instance object from a class object of an entry point class returned from a confirmation method at step S3050A. Then, control unit 1050 starts the software by calling "start method" of the generated instance object.

The configuration of the second embodiment also provides the same effect as that of the first embodiment.

Although only an entry point class is decrypted with confirmation method in the second embodiment, the present invention can load class data/generate class object by encrypting the whole class data, which indicates entries to an archive file, for each entry and storing the data in an archive file of the software when the electronic equipment is manufactured and calling a confirmation method each time it needs to load a class.

The present invention can be configured to check whether class data is not tampered by encrypting message digests of whole class data with the class data to store the encrypted data, and when it loads a class, calculating a message digest from the class data, and comparing the calculated value and the encrypted message digest value stored in a file decrypted with a key for decryption stored in control unit 1050.

The abovementioned control method can be provided by storing a program according to the flow charts of FIGS. 3 and 4 in program storage unit 1060 in electronic element 1010.

Although the present invention has been described with reference to preferred embodiments, the present invention is not limited to the embodiments and various modifications within the scope of the appended claims will be possible. For example, the present invention is not limited to the apparatus of the abovementioned embodiments, and may be adapted to a system consisting of a plurality pieces of electronic equipment or may be adapted to an apparatus consisting of a single piece of electronic equipment. The present invention is also accomplished by supplying a storage medium storing a program code of software providing functions of the abovementioned embodiments to a system or an apparatus and causing a computer (or CPU or MPU) of the system or the apparatus to read and execute the program code stored in the storage medium.

In this case, the program code read out from the storage medium provides functions of the abovementioned embodiment and the storage medium storing the program code comprises the present invention. As a storage medium for supplying a program code, for example, floppy (registered trademark) disk, hard disk, optical disk, magneto-optical disk, CD-ROM, CD-R, magnetic tape, non-volatile memory card, or ROM can be used. The present invention includes the case that functions of the abovementioned embodiments are provided by executing a program code read by a computer. The present invention also includes the case that functions of the abovementioned embodiments are provided by a part or all of the actual processes as an OS operating on the computer to execute the part or all of the actual processes on the basis of the direction of the program code.

The present invention further includes the case that the functions of the abovementioned embodiments are provided as below: A program code read out from a storage medium is written on a function extension board inserted in a computer or memory attached to a function extension unit connected to a computer. Then, a CPU attached to the extension board or the extension unit processes and executes a part or all of the actual processes on the basis of a program code.

What is claimed is:

1. A computer-implemented method for confirming software, comprising steps of:
   determining whether a confirmation program with a predetermined name exists in a software package containing software;
   outputting an error message in a case where it is determined that the confirmation program does not exist in the software package;
   executing the confirmation program which exists in the software package for confirming the software contained in the software package; and
   confirming the software according to an execution result of the confirmation program,
   wherein at least some of said steps are performed using a computer.

2. The method according to claim 1, further comprising a starting step of starting the software confirmed at said confirming step.

3. The method according to claim 1, wherein, in said confirming step, whether equipment where the software is to be installed is compatible with the software is determined according to the execution result of the confirmation program.

4. The method according to claim 1, wherein the error message is output in a case where it is determined that the confirmation program does not exist in the software package and in a case where the software is not confirmed according to the execution result of the confirmation program.

5. The method according to claim 1, wherein,
   in said executing step, first predetermined data is provided to the confirmation program, and
   in said confirming step, the software is confirmed by the confirmation program when a result obtained by processing the first predetermined data matches second predetermined data.

6. An apparatus for confirming software, comprising:
   storage means for storing a software package containing software; and
   execution means for executing the software stored in said storage means,
   wherein said execution means
      determines whether a confirmation program with a predetermined name exists in the software package stored in said storage means,
      outputs an error message in a case where it is determined that the confirmation program does not exist in the software package,
      executes the confirmation program which exists in the software package for confirming the software contained in the software package, and
      confirms the software according to an execution result of the confirmation program.

7. The apparatus according to claim 6, wherein said execution means starts the confirmed software.

8. The apparatus according to claim 6, wherein said execution means determines whether said apparatus is compatible with the software according to the execution result of the confirmation program.

9. The apparatus according to claim 6, wherein said execution means outputs the error message in a case where it is determined that the confirmation program does not exist in the software package and in a case where the software is not confirmed according to the execution result of the confirmation program.

10. The apparatus according to claim 6, wherein
said execution means provides first predetermined data to the confirmation program, and
said execution means confirms the software when a result obtained by processing the first predetermined data matches second predetermined data.

11. A non-transitory computer-readable storage medium storing a computer program for causing a computer to perform steps of:
determining whether a confirmation program with a predetermined name exists in a software package;
outputting an error message in a case where it is determined that the confirmation program does not exist in the software package;
executing the confirmation program which exists in the software package for confirming the software contained in the software package; and
confirming the software according to an execution result of the confirmation program.

12. The non-transitory computer-readable storage medium according to claim 11, wherein the program further comprises a starting step of starting the software confirmed at said confirming step.

13. The non-transitory computer-readable storage medium according to claim 11, wherein, in said confirming step, whether the equipment where the software is to be installed is compatible with the software is determined according to the execution result of the confirmation program.

14. The non-transitory computer-readable storage medium according to claim 11, wherein the error message is output in a case where it is determined that the confirmation program does not exist in the software package and in a case where the software is not confirmed according to the execution result of the confirmation program.

15. The non-transitory computer-readable storage medium according to claim 11, wherein,
in said executing step, first predetermined data is provided to the confirmation program, and
in said confirming step, the software is confirmed by the confirmation program when a result obtained by processing the first predetermined data matches second predetermined data.

* * * * *